RECORD SELECTOR

Filed July 31, 1968 9 Sheets-Sheet 1

INVENTORS
HEINZ-HERMANN VOSS
HANS BRINGER
BY W. R. Kestenbaum
ATTORNEY

RECORD SELECTOR

Filed July 31, 1968 9 Sheets-Sheet 2

INVENTORS
Heinz-Hermann Voss
Hans Bringer
M. R. Kesten
ATTORNEY

Sept. 29, 1970 HEINZ-HERMANN VOSS ET AL 3,530,985

RECORD SELECTOR

Filed July 31, 1968 9 Sheets-Sheet 3

INVENTORS
HEINZ-HERMANN VOSS
HANS BRINGER
BY M. R. Kestenbaum
ATTORNEY

INVENTORS
HEINZ-HERMANN VOSS
HANS BRINGER
BY W. R. Kestenbaum
ATTORNEY

Sept. 29, 1970 HEINZ-HERMANN VOSS ET AL 3,530,985

RECORD SELECTOR

Filed July 31, 1968 9 Sheets-Sheet 5

INVENTORS
HEINZ-HERMANN VOSS
HANS BRINGER
BY
M. R. Kestenbaum
ATTORNEY

RECORD SELECTOR

Filed July 31, 1968

INVENTORS
HEINZ-HERMANN VOSS
HANS BRINGER
BY W. R. Kesting
ATTORNEY

Sept. 29, 1970 HEINZ-HERMANN VOSS ET AL 3,530,985

RECORD SELECTOR

Filed July 31, 1968 9 Sheets-Sheet 7

INVENTORS
HEINZ-HERMANN VOSS
HANS BRAUER

BY W. R. Kesten
ATTORNEY

RECORD SELECTOR

Filed July 31, 1968 9 Sheets-Sheet 8

INVENTORS
HEINZ-HERMANN VOSS
HANS BRINGER
BY M. R. Ketin[illegible]
ATTORNEY

RECORD SELECTOR

Filed July 31, 1968

INVENTORS
HEINZ-HERMANN VOSS
HANS BRINGER
BY W. R. Kistner
ATTORNEY

United States Patent Office 3,530,985
Patented Sept. 29, 1970

3,530,985
RECORD SELECTOR
Heinz-Hermann Voss, 91–93 Moses Hess St., 5 Cologne-Stammheim, Germany, and Hans Bringer, Junkersdorf, Germany; said Bringer assignor to said Heinz-Hermann Voss
Filed July 31, 1968, Ser. No. 749,053
Int. Cl. B07c *3/10*
U.S. Cl. 209—80.5 12 Claims

ABSTRACT OF THE DISCLOSURE

A stack of record carriers, such as file cards are each held at one edge in a rack. Each file card has a spring at its edge which extends into a U-shaped rod which runs longitudinally along the stack. A first selecting and shifting mechanism displaces the selected card laterally with respect to the stack, through the cooperation of the spring. A second shifting mechanism operates transversely to the first and pushes the selected card a greater distance out of the stack sufficient to be engaged by a moving tappet for full withdrawal.

The invention relates to a device for selecting file cards or other sheet-type record carriers and more particularly to a device in which a selected record carrier can be brought out of engagement with a holding device holding other record carriers.

Known devices of this type first loosen up a stack of file cards by magnets so that the stack is no longer compact. Thereafter all file cards except the selected one remain fixed by their index positions and by the selecting devices. The selected card is free to execute a shift movement. These shift movements are brought about by magnets, the respective pole pieces of which are clamped on the file card. As the file cards do not reliably fall out of the card stack by their own weight, an additional shaking magnet is provided, whose pole piece is likewise arranged on the file card and which shakes it out of the card stack so that it falls down.

In another known device the loosening up is effected by a third kind of magnet. The pole pieces thereof are located in the area of the index positions and are intended, if they are magnetized with the same polarity, to repel the cards one from the other. With this device, all cards must be loosened. Much space is thus required in the direction of expansion of the card stack and the pole pieces take space away from the index positions.

The known devices have the disadvantage that the file cards cannot be imprinted magnetically because the many magnets used would erase the information on the magnetic track. Moreover, the file cards must always be arranged to hang because they fall out of the card stack only by their dead weight. An arrangement of the cards one above the other, which in many cases would be desired, is not possible. Above all, however, the cards are not withdrawn in a positive guided manner. Thus, for one thing, it takes a considerable time for the card to fall out, making the access time high, and for another, the access time varies so that timed methods requiring exact time intervals cannot be used.

Accordingly, an objective of this invention is to provide a device of the kind referred to which avoids the disadvantages mentioned above.

Another object of the present invention is to provide a shifting device that can be used jointly for all record carriers that performs only linear movements and that always contacts the same place on the edge of the record carriers which can readily be reinforced.

A further object of this invention is to provide a device for guiding the selected file card as it is withdrawn from the card stack so that the selected card does not come out of the stack in an oblique manner.

Yet another object of the invention is to provide a safety device to prevent unselected file cards from being withdrawn from the stack.

Another object of the invention is to automatically position the selected card for reading as it is withdrawn from the stack to make additional positioning at the reading station unnecessary.

Another objective of this invention is to provide a simple but fast and positive means of withdrawing and transporting the selected index card to a reading station.

An additional object of this invention is to further shorten the access time and to provide a very compact arrangement in which the reading station can be arranged directly adjacent to the stack.

These objects are accomplished in the present invention which provides record carriers having a resilient member such as a spring which is moveable by its free end parallel with a first shift movement of the device. Each resilient member engages at its free end an engaging device extending transversely to the record carriers which is adapted for relative movement with respect to the record carriers. Thereby the record carriers can be shifted in position in a positive manner. By the cooperation of a selection mechanism and the index positions on the record carriers the unselected record carriers will be shifted as above described while retaining the selected record carrier through the resilient member at its original place, so that it protrudes at one edge from the record carrier stack. Alternatively, the record carrier stack can be retained in place moving only the engaging device so that the selected record carrier is shifted beyond the edge of the record carrier stack. By this protrusion of the edge of the selected record carrier a selection can be made by a second shift movement of the device.

Additional advantages and features of the invention will become evident from the following detailed description in conjunction with the drawings, in which.

Figure 1:
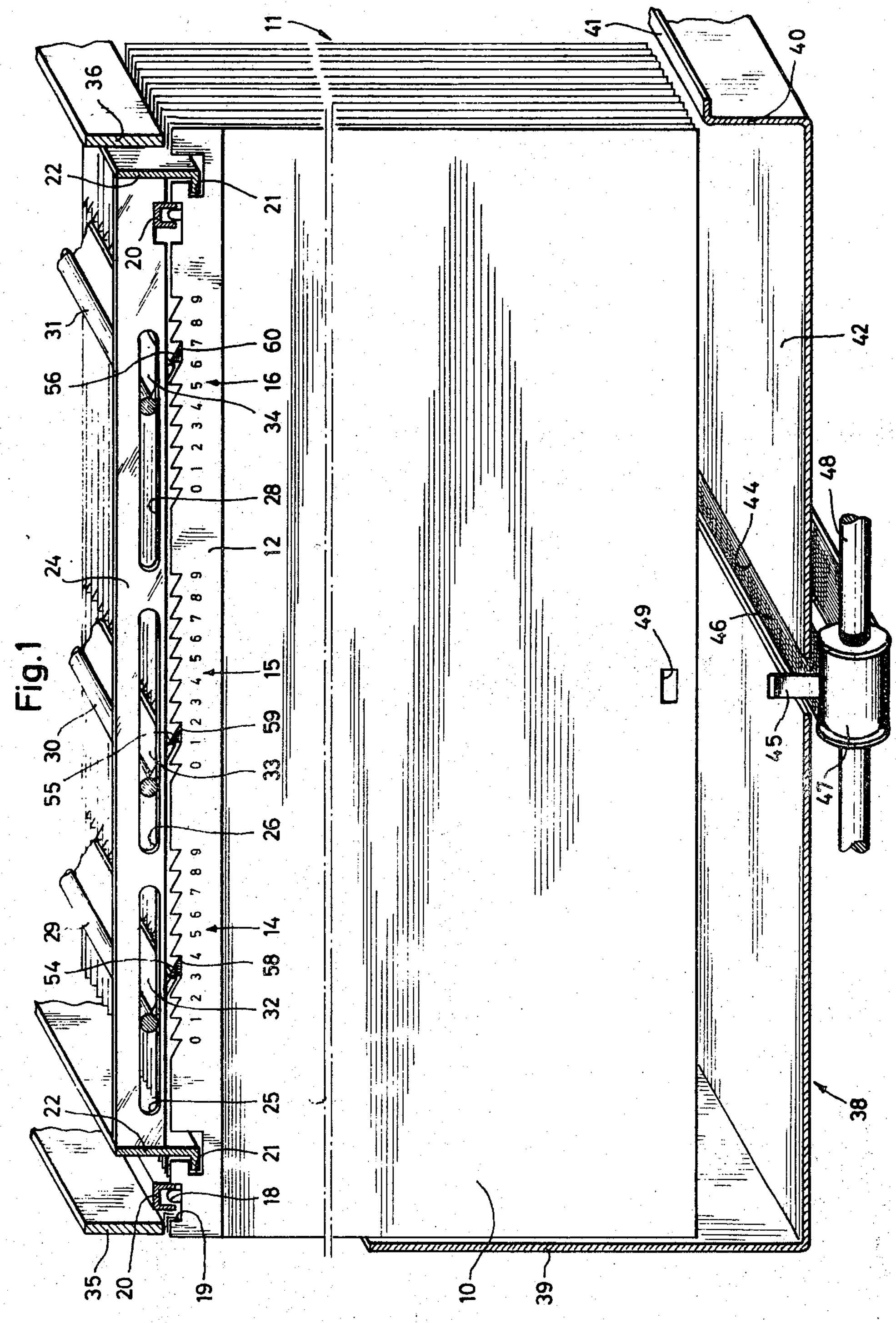
FIG. 1 shows a perspective simplified view of a card stack suspended in a rack, together with transport device.

In the device according to FIGS. 1 to 4 file cards 10 used as record carriers are arranged in a card stack 11 and carry reinforcing slider 12 of plastic at their upper edge. The file cards 10 and sliders 12 are interchangeable with one another. In the example the sliders 12 carry three sets of index positions 14, 15 and 16 for a three-digit decimal number, though a larger number may be used. In addition, two springs 18 are provided on each slider 12. In the area of these springs 18, the sliders 12 have marginally open cutouts 19, whose width is approximately equal to the width of a U-bar 20 plus a distance from symbol to symbol of the index positions 14 to 16. Further, there are provided in the sliders 12 marginally open L-cutouts 21, into which L-bars engage which are mounted in a frame (not shown) parallel with the sliders. The L-bars are rigidly interconnected by cross bars 24, which have slots 25, 26 and 28 corresponding to the three index positions 14, 15, 16. In these slots, rods 29, 30, 31 are guided which can be moved back and forth and to which a pivotal movement can be imparted. To each of the rods 29, 30, 31 a pivot plate 32, 33, 34 is rigidly connected, which extends along the entire card stack 11 at the respective index positions 14, 15, 16.

Above the sliders 12 and at their two ends, sliding rods 35 and 36 are provided which likewise are mounted in the frame (not shown) and can be moved vertically up and down.

Under the card stack 11 a tray 38 is provided which has lateral guide walls 39 and 40, of which the lateral guide wall 39 is much higher than the lateral guide wall 40 and the latter has a rim 41 bent at an angle. The tray bottom 42 is flat and has a longitudinal slit 44 in which a tappet 45 having a hook at its free end is fastened on endless conveyor belt 46. The latter is mounted at its two extremes on rolls 47 whose shafts 48 are mounted rotatably in the frame (not shown). Corresponding with the hook of the tappet 45, the file cards 10 have a rectangular hole 49.

Figure 4:
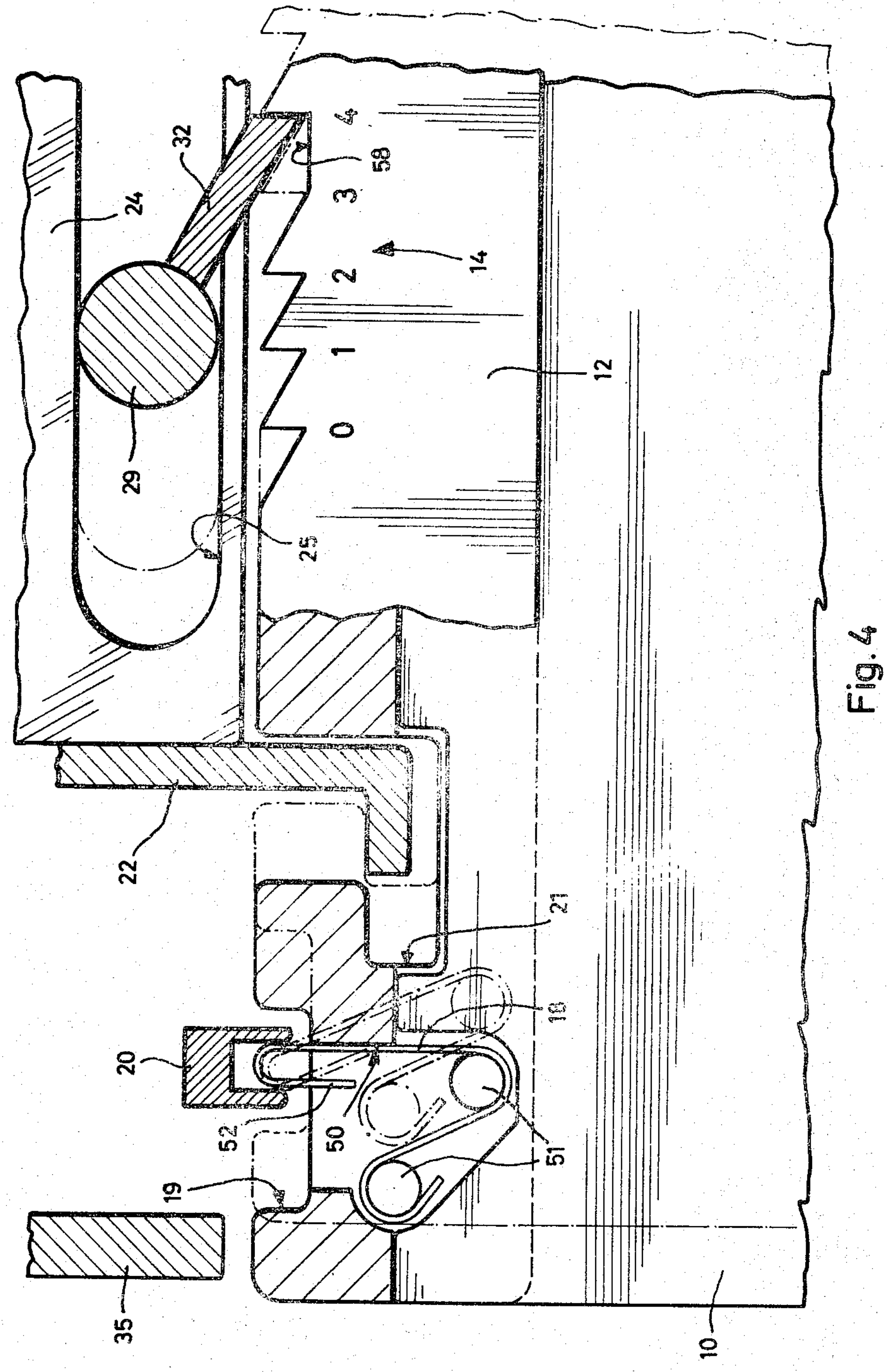
FIG. 4 shows an enlarged front view, partly in section, of the upper left portion of FIG. 1.

Referring to FIG. 4, spring 18 has a stop 50 on the slider 12, so that in its non-operating state it always has a well defined position. Moreover, it is placed around two pins 51 and its free end 52 is bent over. The slider 12 provides a good mechanical anchoring for the spring 18. The bend of the spring prevents undesirable catching and ensures against mutilation.

The device operates as follows:

At first all file cards 10 hang on the L-bars 22 as shown in FIG. 1. Rods 29, 30, 31 are in their left starting position as viewed in the figure and the pivot plates 32, 33, 34 lie horizontally. Further, the tappet 45 is behind the rear end (not shown) of the card stack 11. Now if, for example, the front file card 10 visible in FIGS. 1 to 4 is to be selected, which in the example bears the index number 316, the rods 29, 30, 31 are synchronously moved to the right. When rod 30 has reached its position 1, pivot plate 33 falls. When rod 29 has reached position 3 pivot plate 32 falls and when rod 31 has reached its position 6 pivot plate 34 falls. Rods 29, 30, 31 cannot go further to the right because metal strips (not shown) are provided adjacent the end faces of the card stack, which metal strips have serrations according to the index positions and against which the pivot plates 32, 33, 34 rest.

Figure 2:
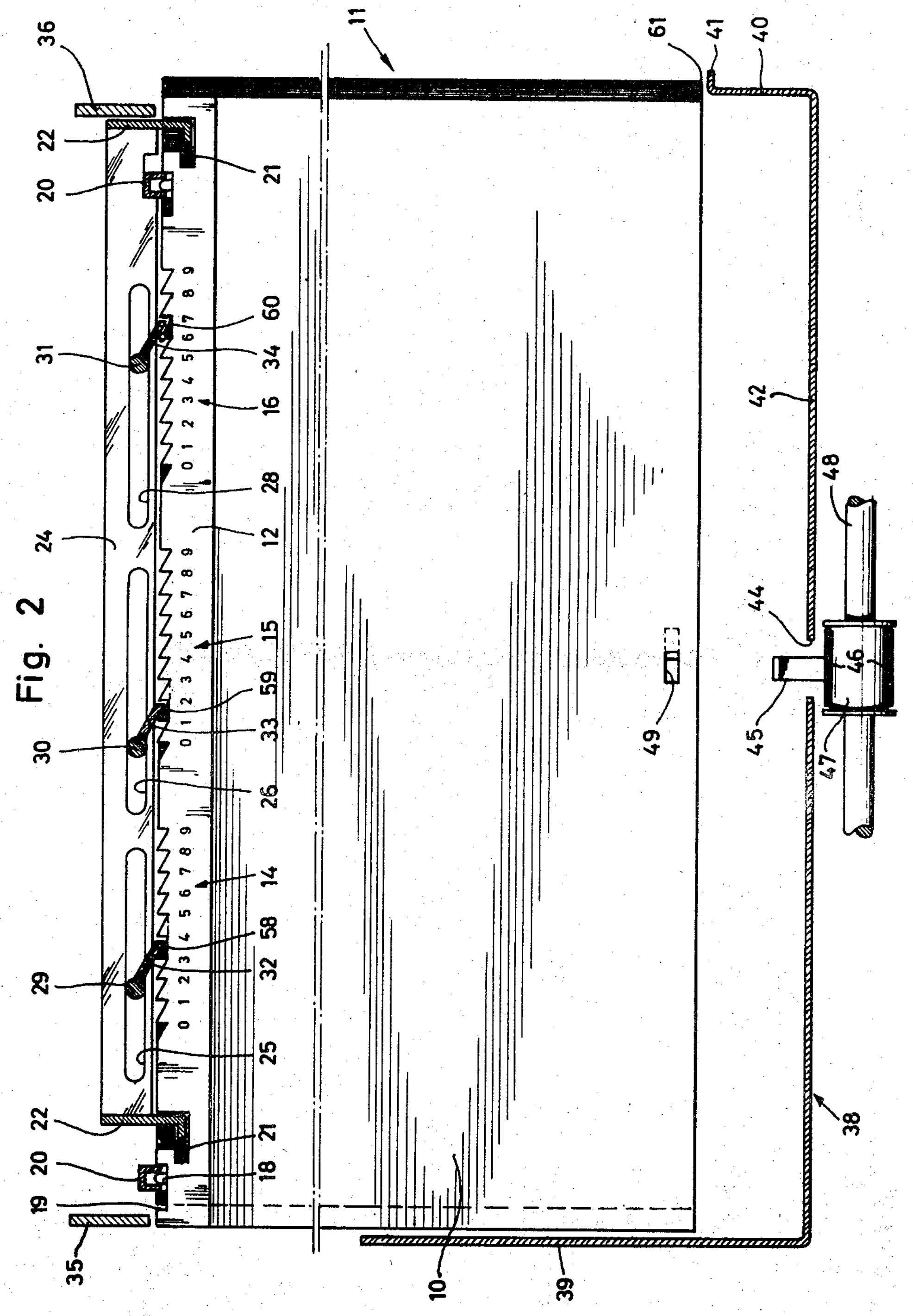
FIG. 2 shows the device in front view at a first selecting step.

After this process, the L-bars 22 together with rods 29, 30, 31 and with the card stack 11 move to the right by one division (FIG. 2). The U-bars 20 and the sliding rods 35, 36 as well as the tray 38 do not participate in this movement. Naturally all file cards of the card stack 11 attempt to remain in the position shown in FIG. 1 as the springs 18 strive to hold the file cards in place.

Only the frontmost file card 10 is able to be held in place by its spring 18 because the end faces of the pivot plates 32, 33, 34 do not encounter any resistance in the forms of the tabs 54, 55, 56 present on all other file cards. Instead, the frontmost file card 10 has at its respective index positions cutouts 58, 59, 60. The lower right corner 61 of the card stack 11 is now located above the tray rim 41. This serves as a prop to preclude file cards which have not been selected from shifting out of the stack. The sliding bars 35, 36 can now be moved downward. For the sliding bar 35 no special arrangements on the slider 12 are necessary as the left edge of slider 12 on card 10 now protrudes from the card stack and there is no obstacle to the movement of the sliding rod 35. In order that the right sliding rod 36 can likewise move downward to strike only against the slider 12 of the selected frontmost file card 10 all sliders 12 have a wide L-cutout 21, into which the sliding rod 36 can enter unhindered during the downward movement. Moreover, the L-cutouts 21 are formed so that the sliding rods 35, 36 can move sufficiently far downward.

Figure 3:
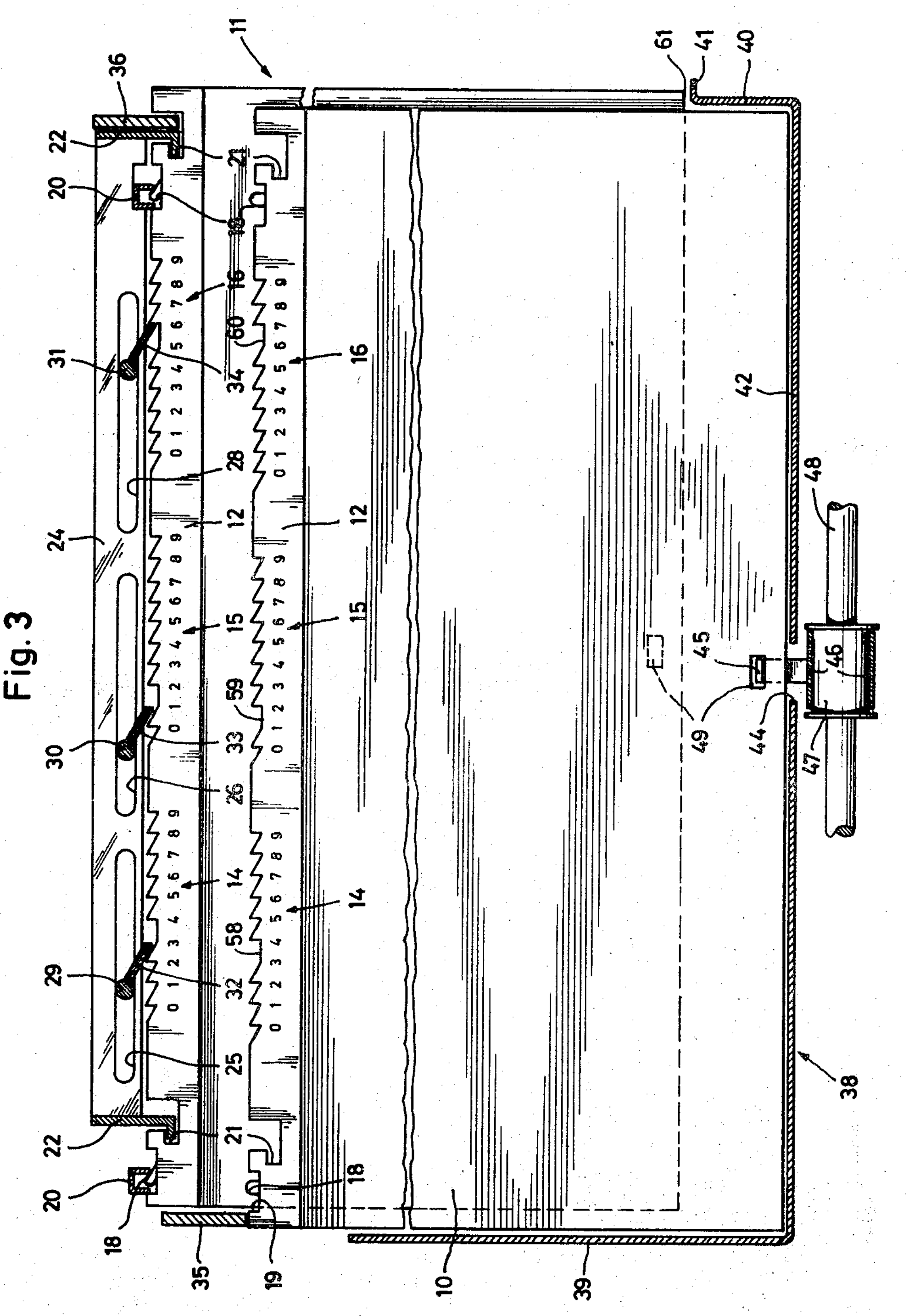
FIG. 3 shows the device in front view at a second selecting step.

Referring to FIG. 3, the sliding rod 36 does not move as far down as the sliding rod 35. Yet the selected file cards 10 do not tilt (cant) because they are guided by the lateral guide walls 39 and 40 during their downward movement. The movement of the sliding rod 36 can therefore be made relatively short. When the file card 10 has arrived at the very bottom, so that its lower edge rests on the tray bottom 42, tappet 45 is moved forward and pulls out the selected file card by means of the hole 49. During extraction from the card stack, the file card 10 bends away until it lies flat on the tray bottom 42. However, it can bend readily for the reason that the lower edge of the card stack 11 hangs considerably above the tray bottom 42. Depending on how much a file card 10 can be bent without permanent deformation, this distance must be greater or smaller. Accordingly also the radius of curvature becomes greater or smaller. The flat bottomed tray and the guide walls 39, 40 which are spaced apart at about the length of the file card, centers the card during transport and in many cases renders an additional positioning at the reading station unnecessary. The combination of the cutout 49 in the file card and the tappet 45, which can transport the card directly to the reading station provides a fast and positive means for withdrawing and transporting the file card. Thus, the reading station can be arranged directly in front of the stack.

It can be seen that the record carrier can be shifted downward out of the stack by a greater distance than it can be shifted laterally, since the file card can be shifted laterally at most the distance between adjacent index positions. Only a small spacing can be maintained between index positions since many positions are required. Such spacing provides too small a marginal extension to permit the file card to be withdrawn by the engaging tappet 45 in the manner described.

Figure 5:
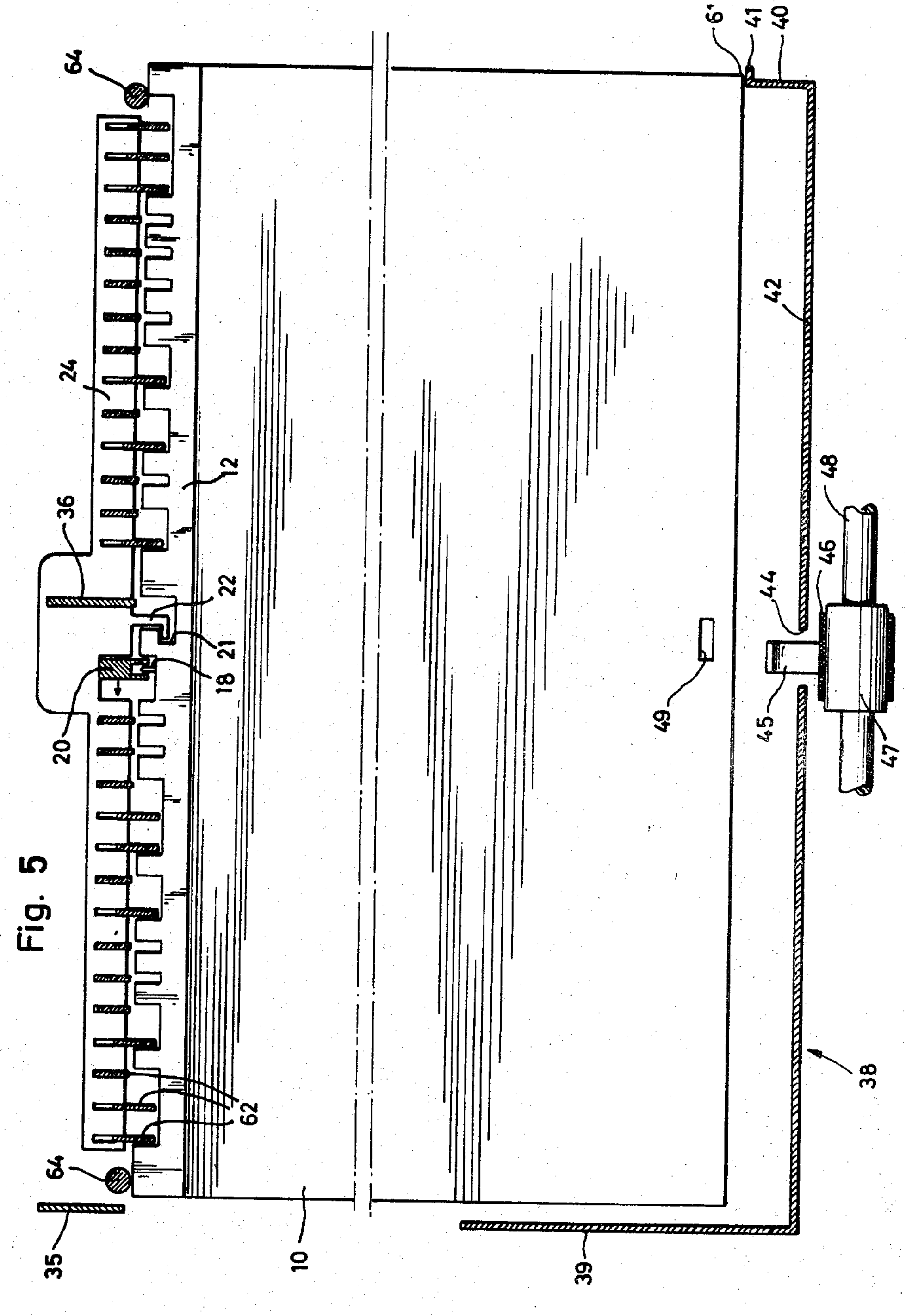
FIG. 5 shows a second embodiment of the invention in front view.
Figure 6:
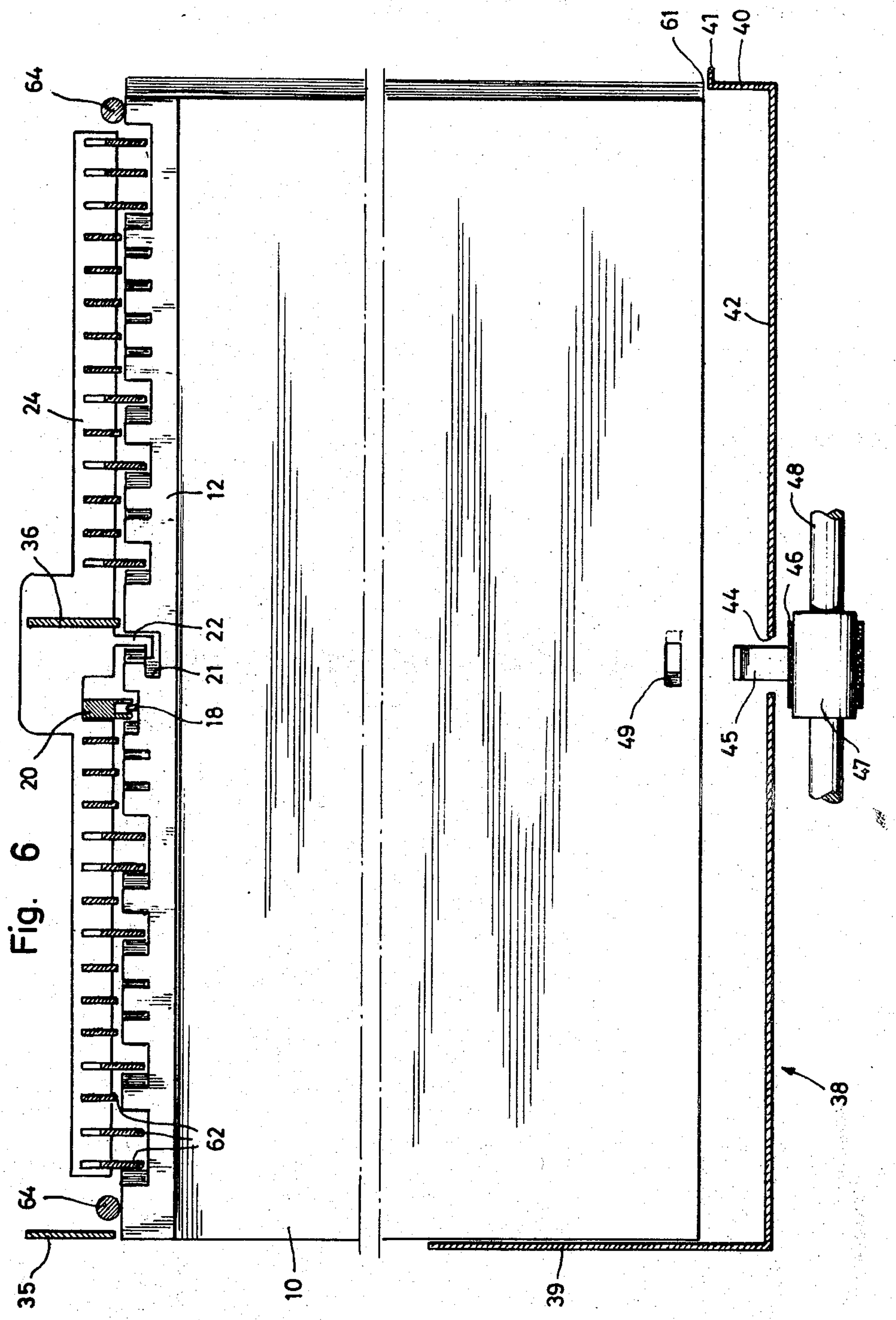
FIG. 6 shows the second embodiment at a first selecting step.
Figure 7:
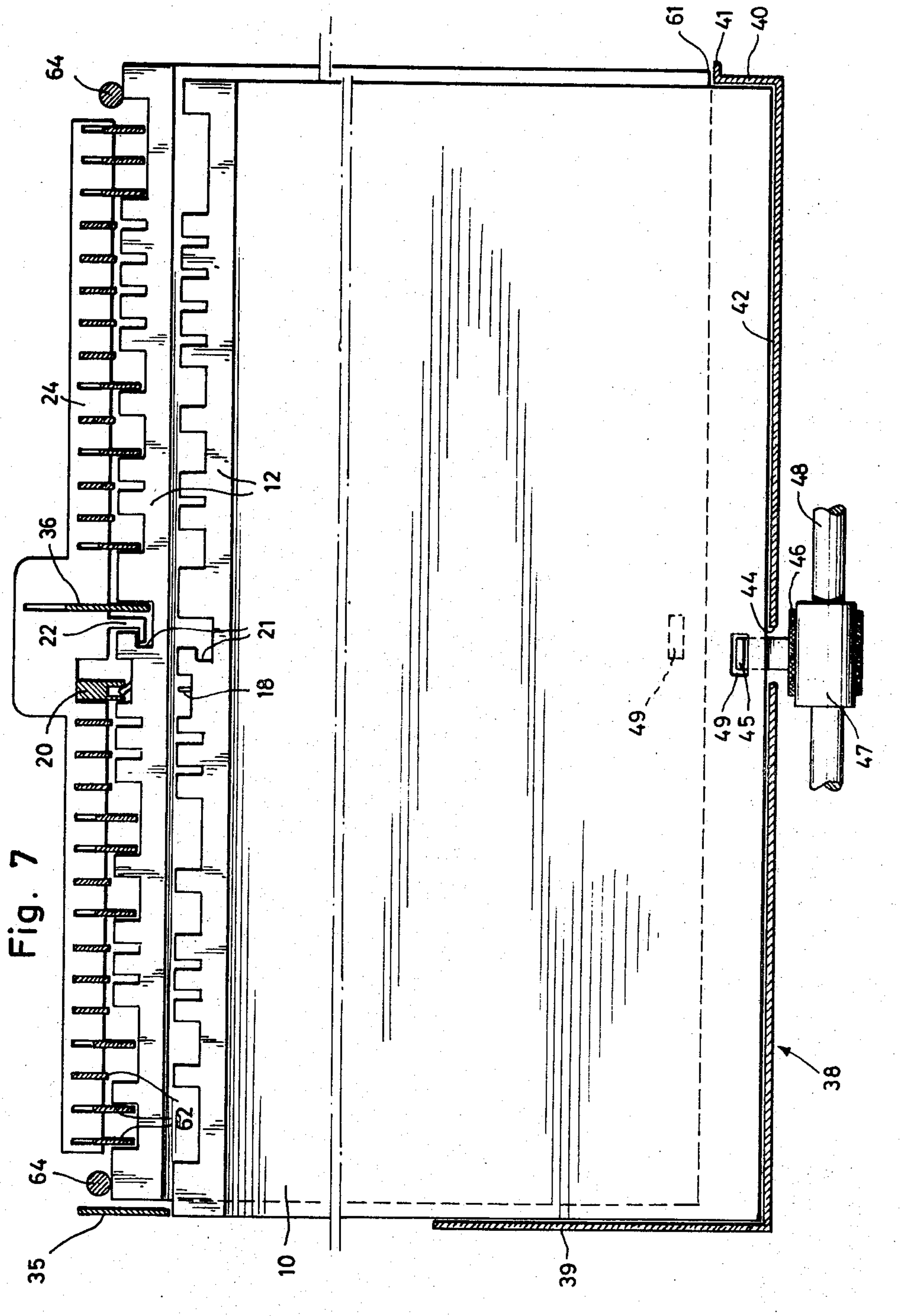
FIG. 7 shows the second embodiment at a second selecting step.

In the embodiment shown in FIGS. 5 to 7, the card stack 11 has such a neutral position in which the lower right corner 61 is arranged above the tray rim 41. After the selection of the desired file card 10 has been made by slides 62, the U-bar 20 is moved to the left and thereby tensions all springs 18. Only the spring 18 of the selected frontmost file card 10 is not tensioned or is hardly tensioned because no slide 62 prevents it from moving to the left with the U-bar 20. Thus, as in the first embodiment, it moves clear of the L-bar 22 and can be pushed downward by the sliding rods 35, 36 so that finally it can be gripped by the tappet 45 according to FIG. 7 and transported to a reading station.

In this second embodiment additionally, a three-point suspension of the file cards is provided, the L-bar 22 providing one and the cross bars 64 the other two points.

Figure 8:
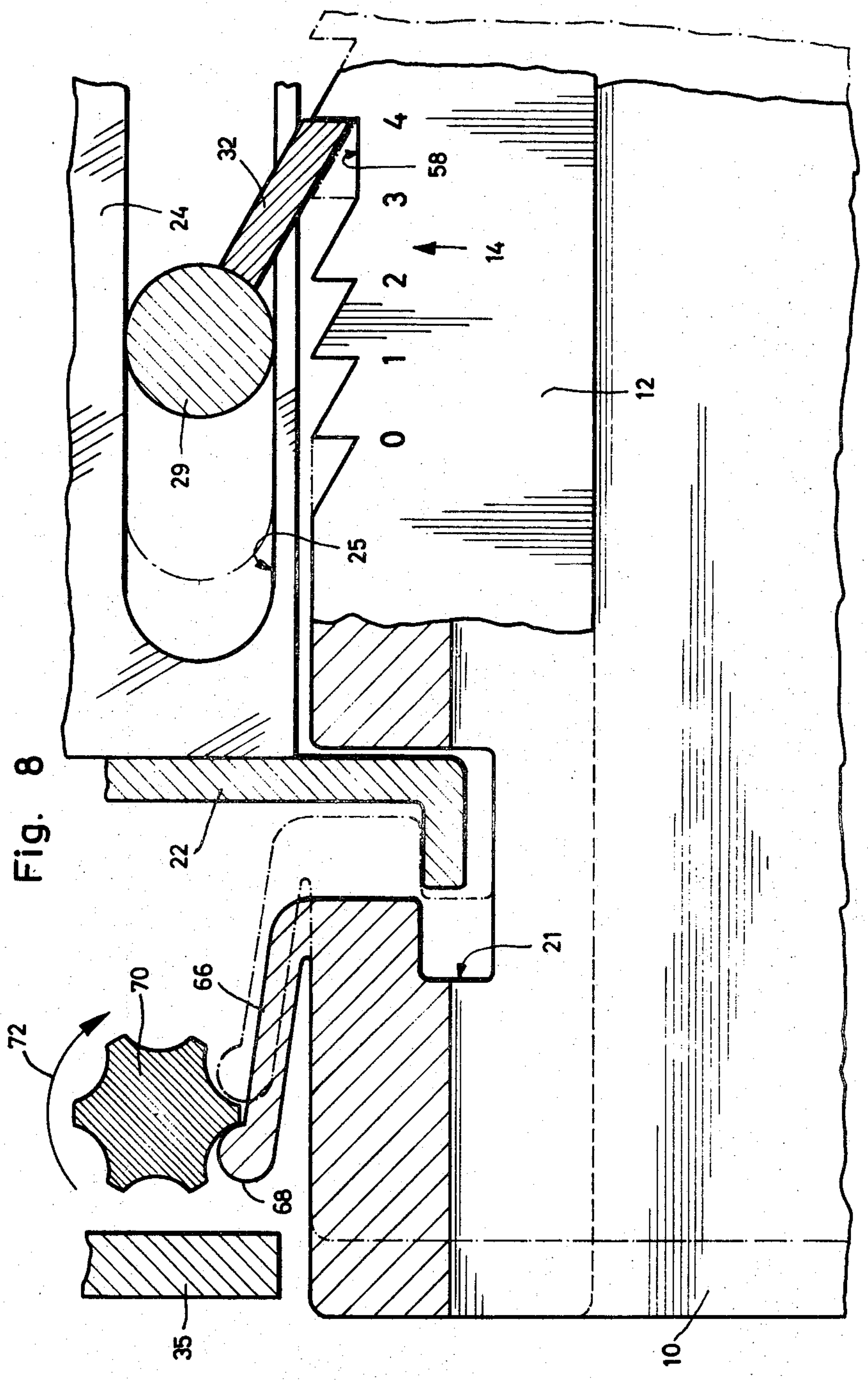
FIG. 8 is a view as in FIG. 4 of a third embodiment of the invention.

Referring to FIG. 8 in a third embodiment, instead of the spring 18 a leg 66 is employed which is integral with the slider 12 and has been formed together with the slider 12 for example by injection molding. At its left end the leg 66 has a widened portion 68 which in operation rests against a star wheel 70. This star wheel rotates in the direction of the arrow 72. The star wheel 70 and the widened portion 68 are in operative connection because spring force of the leg 66 strives to pivot clockwise about its right end.

When the star wheel 70 rotates in the direction of arrow 72 all file cards which are not retained by the pivot plates 32, 33, 34 are moved to the left. This example has the advantage of the active separation (elimination) of selected file cards.

Figure 9:
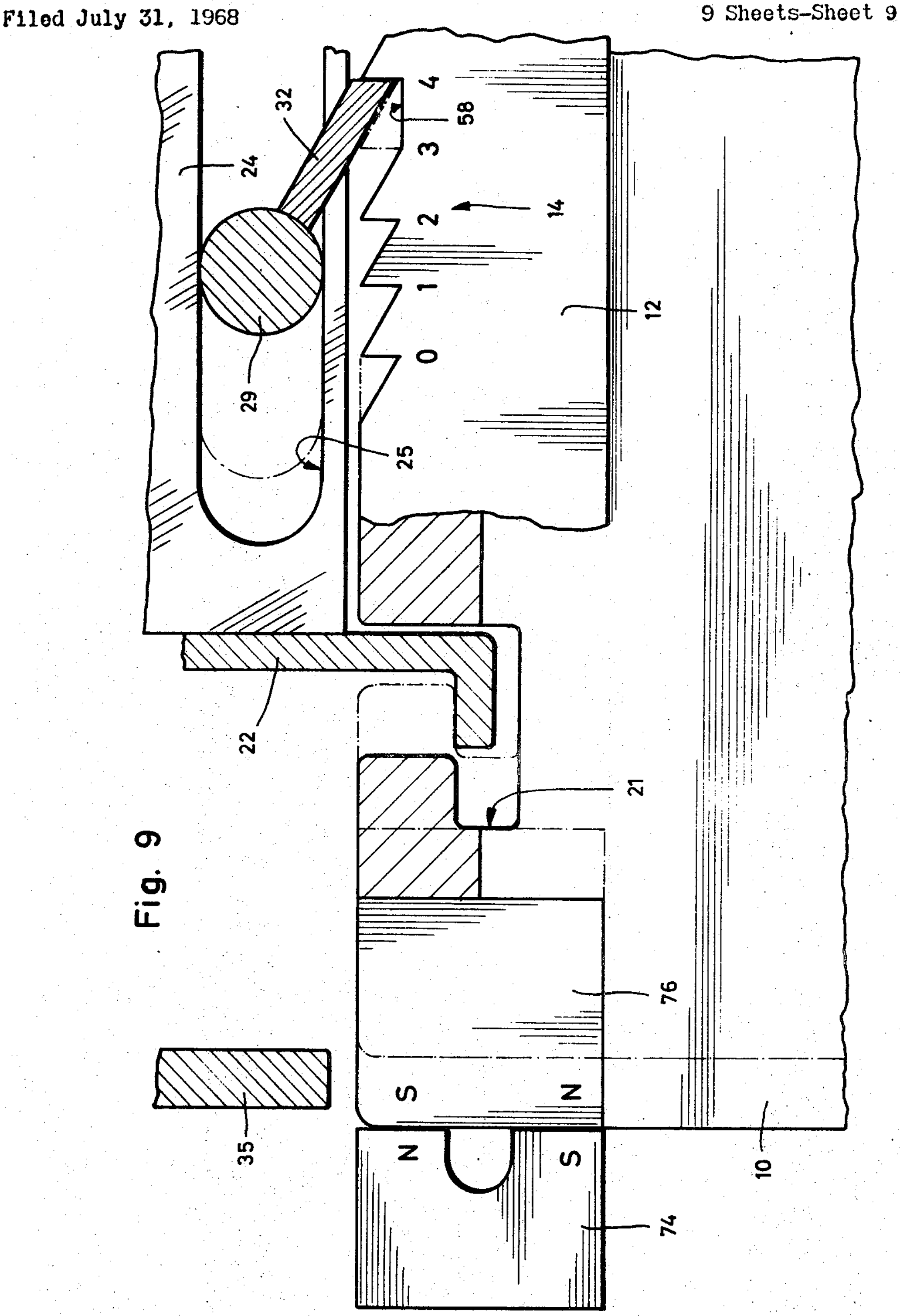
FIG. 9 shows a fourth embodiment of the invention.

Referring to FIG. 9 a last preferred embodiment employs a fixed permanent magnet 74. It extends along the upper left edge of all file cards and is in power-coupled connection with all pole pieces 76 on these file cards until a selection takes place. By virtue of the selection all file cards not selected are moved to the right and only the selected file card 10 adheres to the permanent magnet 74 by means of the pole piece 76. Here a permanent magnet is used but a demagnetization of magnetic tracks present on the file card 10 such as would be the case if the magnet were energized by alternating current, does not occur. Moreover, in the non-operative state the entire field is short-circuited by the pole pieces 76, so that no stray field penetrates that could have a demagnetizing effect. Also after the selection the field is short-circuited by at least one pole piece of a selected file card 10 and the other file cards then have a distance from the permanent magnet 74 for which demagnetizations are no longer to be feared. Lastly this embodiment has the advantage that already before the selection a very much greater holding force for the retention of the file cards is available than is the case with known devices of this kind. With the latter, in fact, the pole pieces 76 are attracted from a greater distance, and therefore an extremely strong magnetic field is needed.

In the embodiments described, the frontmost card 10 was indicated as the selected card. It may of course be any card within the card stack. By the device according to the invention there are obtained extremely short access times, very inexpensive racks, always a constant filling of the rack. The spring prevents the cards from assuming an oblique position and the rack can be used in any spatial position and with systems accelerated to any degree. Because the usual shaking is eliminated, there is no disturbing noise, timed working is possible and a broad area of application is accessible which was formerly closed to known devices of this kind.

The device according to the invention can be used for example, for signature verification in banks. In a central installation all signatures are stored on file cards, which can then be rendered visible on a picture screen within about one second. The cards may bear photographic, sound, magnetic, typewritten, handwritten or other records. They can be used for billing, for writing addresses and for posting. For automatic writers, texts can be stored on them. They may carry dispositives or supply music boxes with sound carriers instead of phonograph records. One can print books with them without having to collate the pages as the pages can be fed to the scanner for the printer just as they will be arranged later in the book. In machine tool control they can be used instead of the usual perforated tapes. They may also constitute the sound carrier for dictating machines. The card stack need not comprise file cards of the same nature. They may be partly imprinted magnetically, partly transparent, or contain handwriting. All that is necessary then is that optical, magnetic, or similar reading devices be provided in the reading station, for example, on a turret head or a slide.

It should be understood that specific embodiments have been described for purposes of explanation and understanding and that changes and modifications can be made to these specific embodiments without departing from the spirit and teachings of the present invention in accordance with the following claims.

What is claimed is:

1. A device for selecting a sheet-type record carrier from a plurality of record carriers comprising:

(a) means of holding said record carriers at at least one edge thereof, (b) selection means for selecting said record carrier, (c) shifting means for causing a relative shift movement between the selected record carrier and the unselected record carriers by which the selected record carrier can be brought out of engagement with said holding device, (d) engaging means extending along said record carriers and adapted for relative movement with respect to said record carriers;

each of said record carriers having:

(a) index means which are lockable or releasable by said selection means, and (b) a resilient member moveable at its free end parallel with said shift movement, said resilient member being in engagement with said engaging means.

2. A device according to claim 1 comprising a second shift means for causing a shift movement of the selected record carrier normal to said first shift movement.

3. A device according to claim 2 in which said second shift means comprises at least one longitudinally extending member which can be brought to an edge of said record carrier transversely to said first shift movement and to the means for shifting the selected record carrier out from said plurality of record carriers.

4. A device according to claim 2 in which said second shift means comprises longitudinally extending means which pushes only against said selected record carrier in its displaced state in relation to said unselected record carriers.

5. A device according to claim 1 comprising tray means having lateral guide walls for said selected record carrier and prop means for said unselected record carriers.

6. A device according to claim 5 in which said tray means has a flat bottom guide surface and said lateral guide walls are spaced apart approximately the width of said record carrier.

7. A device according to claim 1 comprising tappet means adapted for movement along said plurality of record carriers, each of said record carriers having means at one of its marginal regions adapted to engage with said tappet means whereby said record carrier can be transported by said tappet means.

8. A device according to claim 7 in which said tappet is adapted to transport said record carrier directly to a reading station.

9. A device according to claim 1 in which said resilient member comprises a spring fastened to a slider affixed at one edge of said record carrier, said slider having said index means thereon and a stop for defining the non-operating position of said spring.

10. A device according to claim 9 in which said engaging means comprises a U-shaped longitudinally extending member and the free end of said spring comprises a bent portion adapted to engage with said U-shaped member.

11. A device according to claim 1 in which said selection means comprises a plurality of pivot plates having a common drive which moves them generally parallel to said index means, pivot means for pivoting each of said plates at its selected index position, and means for holding each plate at its selected index position notwithstanding the continued movement of pivot plates which have not yet pivoted at their selected index positions.

12. A device according to claim 1 in which said resilient member comprises a resilient arm attached to an edge of said record carrier having an end portion adapted to be moved along by a rotatable stationary gear parallel to said shift movement.

References Cited

UNITED STATES PATENTS

| | | | |
|---|---|---|---|
| 2,379,943 | 7/1945 | Whitson | 209—111.8 |
| 3,199,674 | 8/1965 | Kalthoff | 209—80.5 |

RICHARD A. SCHACHER, Primary Examiner